Nicholas A. Begovich,
INVENTOR.

ATTORNEY.

Nicholas A. Begovich,
INVENTOR.

BY.

ATTORNEY

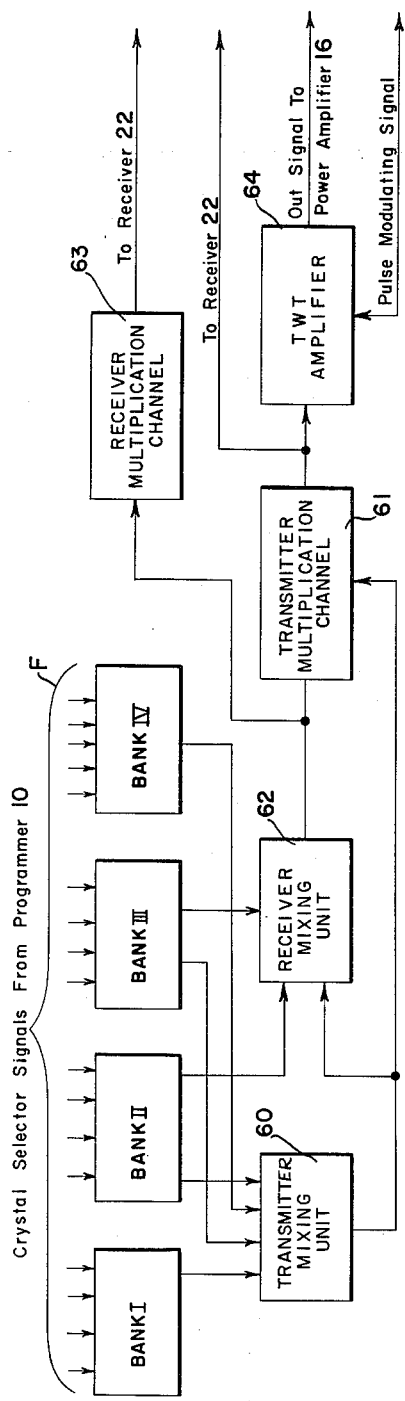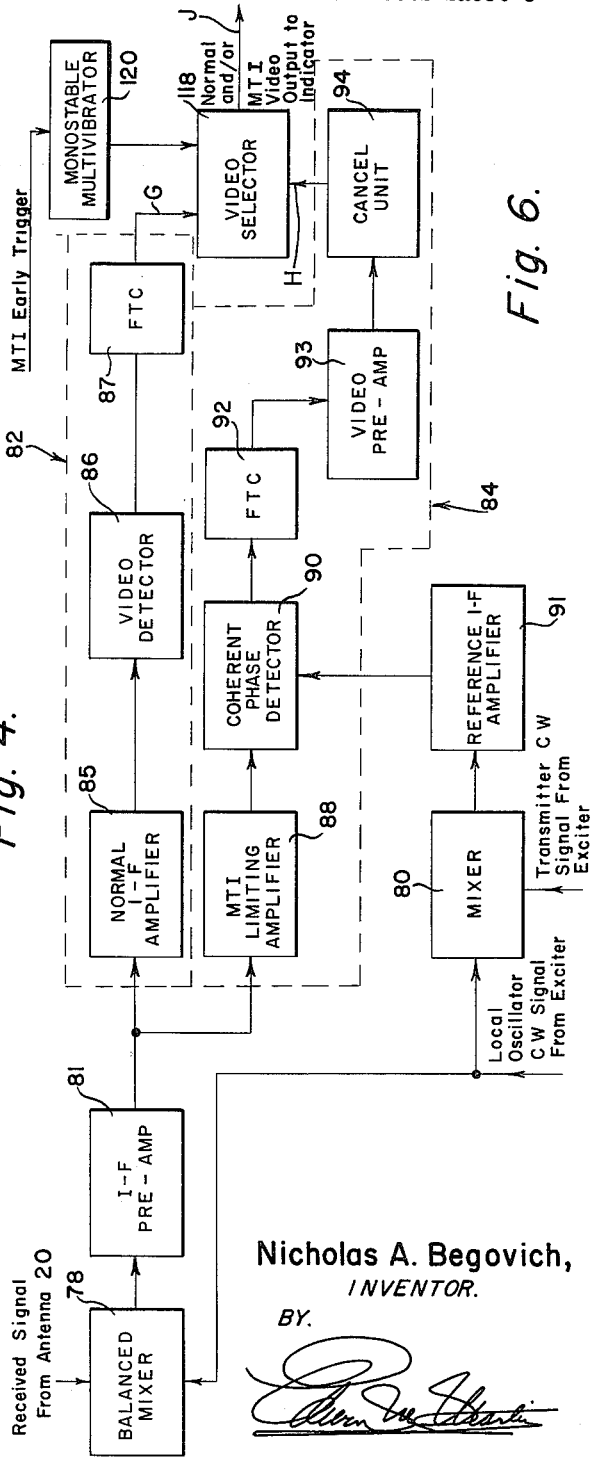

July 24, 1962 N. A. BEGOVICH 3,046,547
TWO-PULSE MTI RADAR SYSTEM
Filed Nov. 23, 1956 6 Sheets-Sheet 4
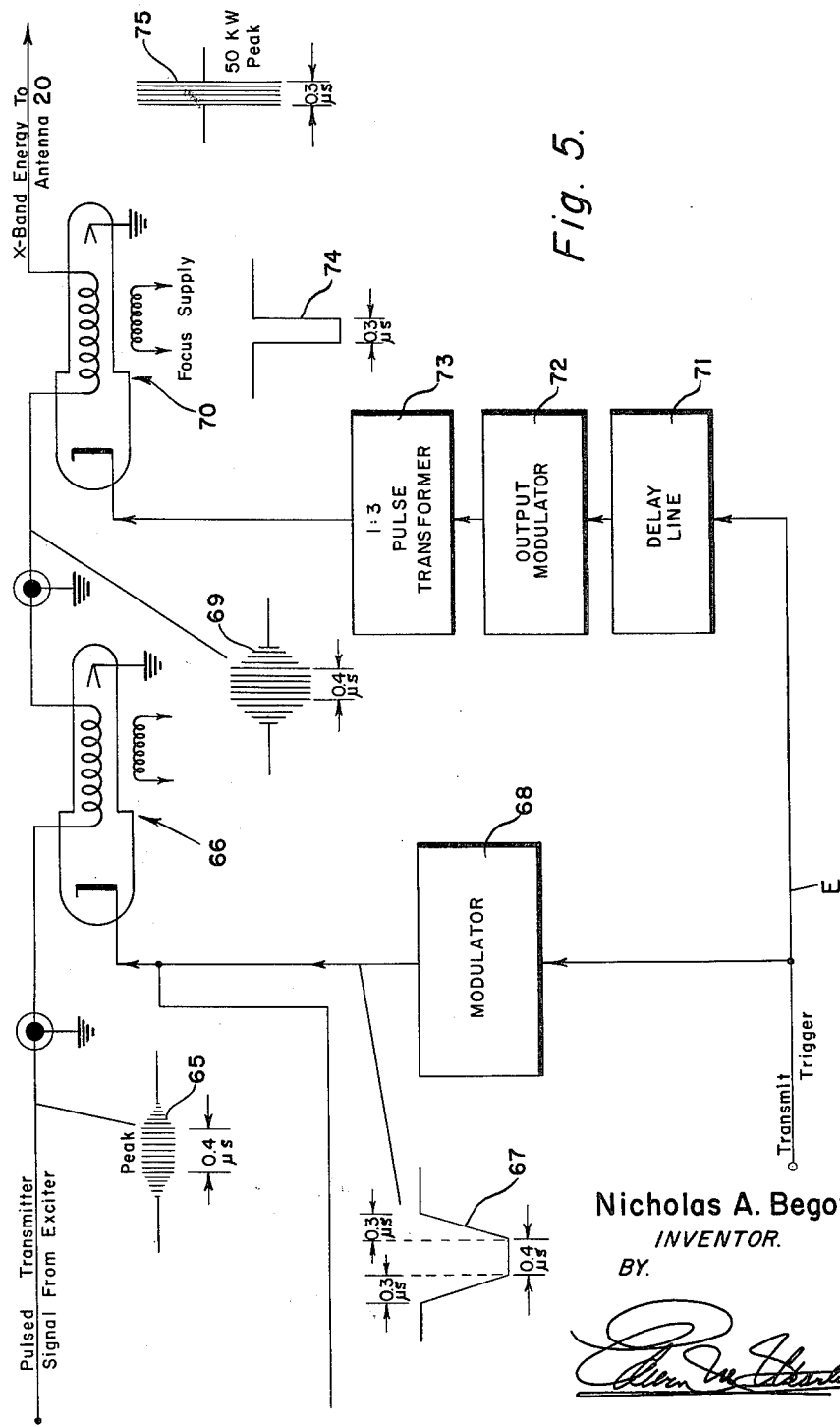
Fig. 5.
Nicholas A. Begovich,
INVENTOR.
BY
ATTORNEY.

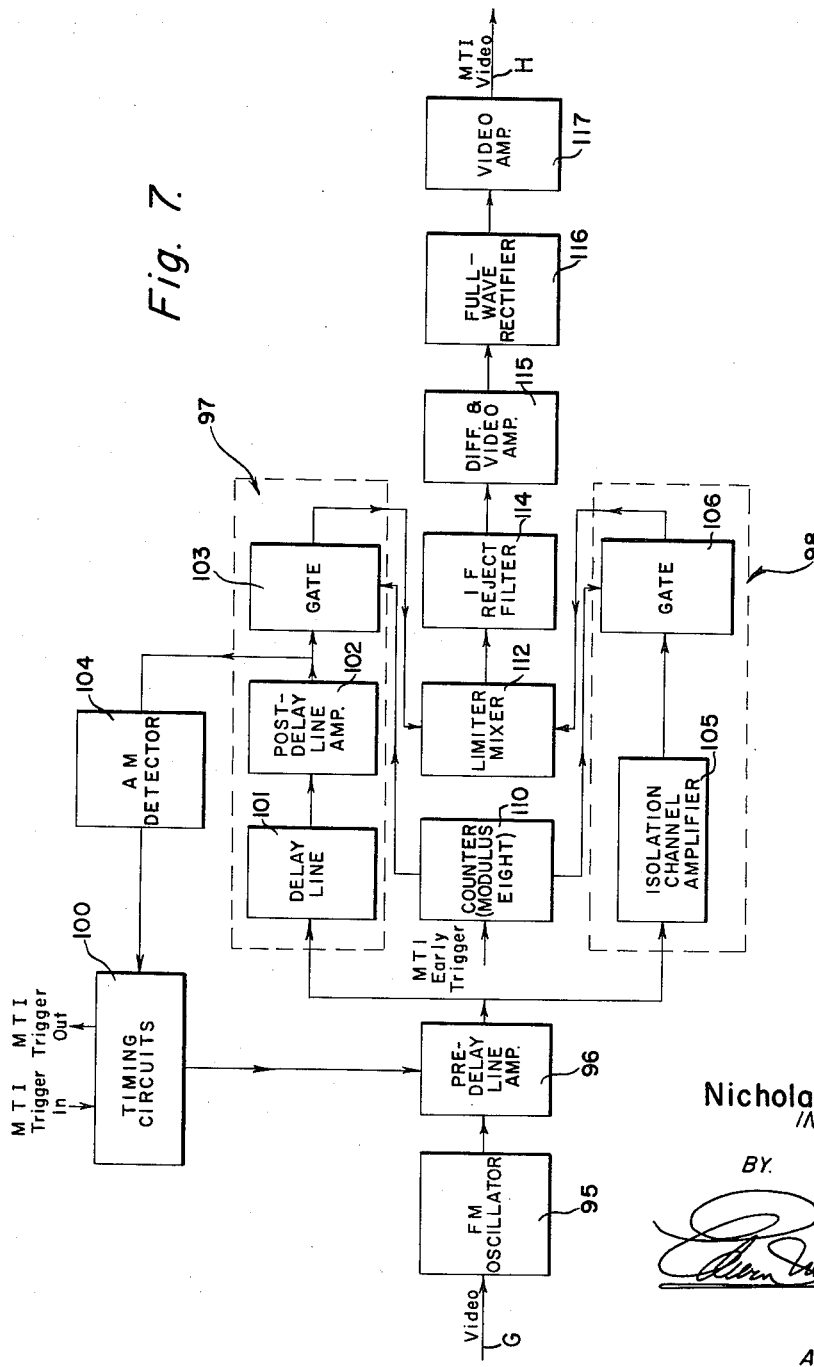

United States Patent Office 3,046,547
Patented July 24, 1962

3,046,547
TWO-PULSE MTI RADAR SYSTEM
Nicholas A. Begovich, Los Angeles, Calif., assignor to Hughes Aircraft Company, Culver City, Calif., a corporation of Delaware
Filed Nov. 23, 1956, Ser. No. 624,155
2 Claims. (Cl. 343—7.7)

This invention relates to frequency scan moving target indication (MTI) radar systems and more particularly to an MTI radar system which utilizes a step-scan to effect improved ground clutter rejection performance.

Moving target echoes are frequently obscured in a radar display by the echoes from slowly moving or large fixed targets called clutter. It is usually desirable to eliminate the display of fixed target signals completely in order to better observe the moving targets. Weather conditions sometmies give rise to clutter fluctuation (slowly moving rain clouds, sea echoes, wooded hills on a windy day, etc.) which also obscures the presentation of moving targets. Intentional radar interference in the form of artificial clutter, such as "window" or "chaff" can also make the detection and tracking of a moving target very difficult. It is desirable therefore to reject the presentation of all targets with radial velocities equivalent to clutter velocities.

Moving target echo signals can be separated from the echoes from fixed targets by utilizing the differences in the characteristics of the signal from the two types of target. These differences are due to the magnitude of the radial velocity of the moving target which produces a change in frequency of the echo signal, the Doppler shift, and to the space displacement of the moving target. The Doppler frequency shift effect may be used with a non-coherent or coherent moving target indication (MTI) system to determine the presence of moving targets. Although the MTI system of the present invention may be of either the non-coherent or coherent type and is readily adaptable to moving platform type radars, a coherent type system is shown and described by way of example.

The disclosed embodiment of the present invention is a coherent frequency scan MTI radar system wherein improved ground clutter rejection is effected by employing a step-scanning antenna as distinguished from an antenna which scans continuously. Accordingly to the present invention, a transmitter sends out a pulse of a frequency corresponding to a given beam position, and the local oscillator of an associated receiver is maintained at a constant frequency until immediately prior to the succeeding transmitter pulse. The next pulse transmitted at the same frequency is incident on exactly the same ground area whereby no space decorrelation (scanning noise in the electronic scanning dimension) of the clutter signal occurs.

Also, a disadvantage of present-day short range radar systems is that the pulse repetition frequencies are restricted to a frequency of the order of 2000 cycles per second so as to avoid "second time around" echoes. In the present frequency-scan MTI radar system, the frequency is changed from pulse-to-pulse thereby rendering the receiver insensitive to targets whose echoes arrive after one radar pulse repetition period whereby the aforementioned restriction does not exist. Changing the frequency from pulse-to-pulse is made compatible with MTI requirements, i.e., having two pulses at the same frequency, by having the two pulses of the same frequency separated by several pulse repetition periods and using the intervening time interval to transmit pulses of other frequencies.

It is therefore an object of the present invention to provide an improved MTI radar system.

Another object of the invention is to provide a short range MTI radar system which incorporates a high pulse repetition frequency without the concomitant disadvantage of receiving "second time around" echoes.

Still another object of the invention is to provide a coherent or non-coherent MTI radar system capable of transmitting at least two pulses in the same selected direction whereby space-decorrelation of a resulting clutter signal is minimized, thereby enabling substantially complete clutter cancellation.

According to the invention, the radar system of the present invention comprises a frequency scan antenna, a transmitter and a receiver. The frequency scan antenna may be of the type disclosed in a copending application, entitled Instrument Approach and Landing System for Aircraft, Serial No. 534,641, filed September 16, 1955, by Nicholas A. Begovich et al., now U.S. Patent No. 2,952,845, issued September 13, 1960, and assigned to the same assignee as the present case. The transmitter configuration is a master oscillator exciter unit power amplifier (MOPA). The exciter unit has available in continuous wave form the transmitter and local oscillator signals. These signals are generated in the exciter unit by crystal-controlled oscillators which possess the critical frequency stability requirements necessary for a coherent MTI system. The coherent reference I.F. signal (the coho signal) may therefore be derived simply by mixing together the crystal-controlled transmitter and local oscillator continuous wave signals.

The receivers of the disclosed radar system preferably provide both normal and single cancellation MTI video outputs for all the antenna beam positions throughout the scanned volume. The range of display of MTI video on the indicator console is made adjustable, with normal video being presented for the remainder of the range sweep. Further, simultaneous presentation of normal and MTI video is also provided so as to illuminate faintly the display with the geographical contours of the surrounding territory.

The above-mentioned and other features and objects of this invention and the manner of attaining them will become more apparent by reference to the following description taken in conjunction with the accompanying drawings, wherein:

FIG. 4 shows a schematic block diagram of the exciter unit in the radar system of FIG. 1;

FIG. 5 shows a schematic diagram of the transmitter unit in the radar system of FIG. 1;

FIG. 6 shows a schematic block diagram of the receiver in the radar system of FIG. 1;

FIG. 7 shows a schematic block diagram of the cancellation unit in the receiver of FIG. 5.

A general description of the disclosed radar system will first be presented to provide an overall concept of the present invention. This general description will be followed by a more detailed description of the design and operation of the system. In order to point out more clearly the invention, simplifications will be made wherever possible and functions not essential to the basic mode of operation such as, for example, temperature compensation and space stabilization, will be omitted from the description.

Figure 1:
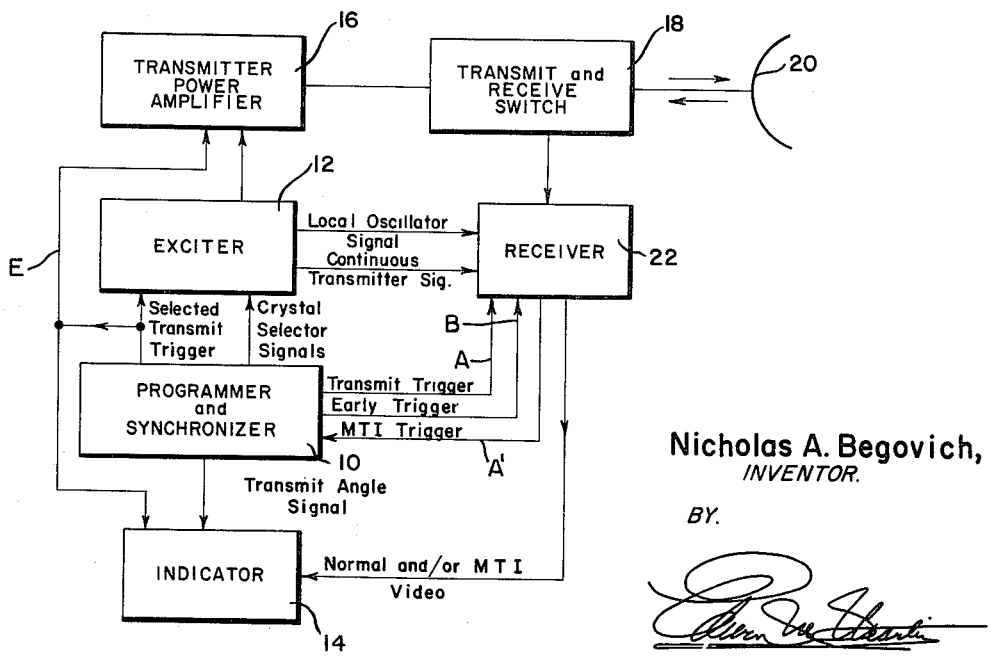
FIG. 1 shows a schematic block diagram of the MTI radar system of the present invention.
Figure 8:
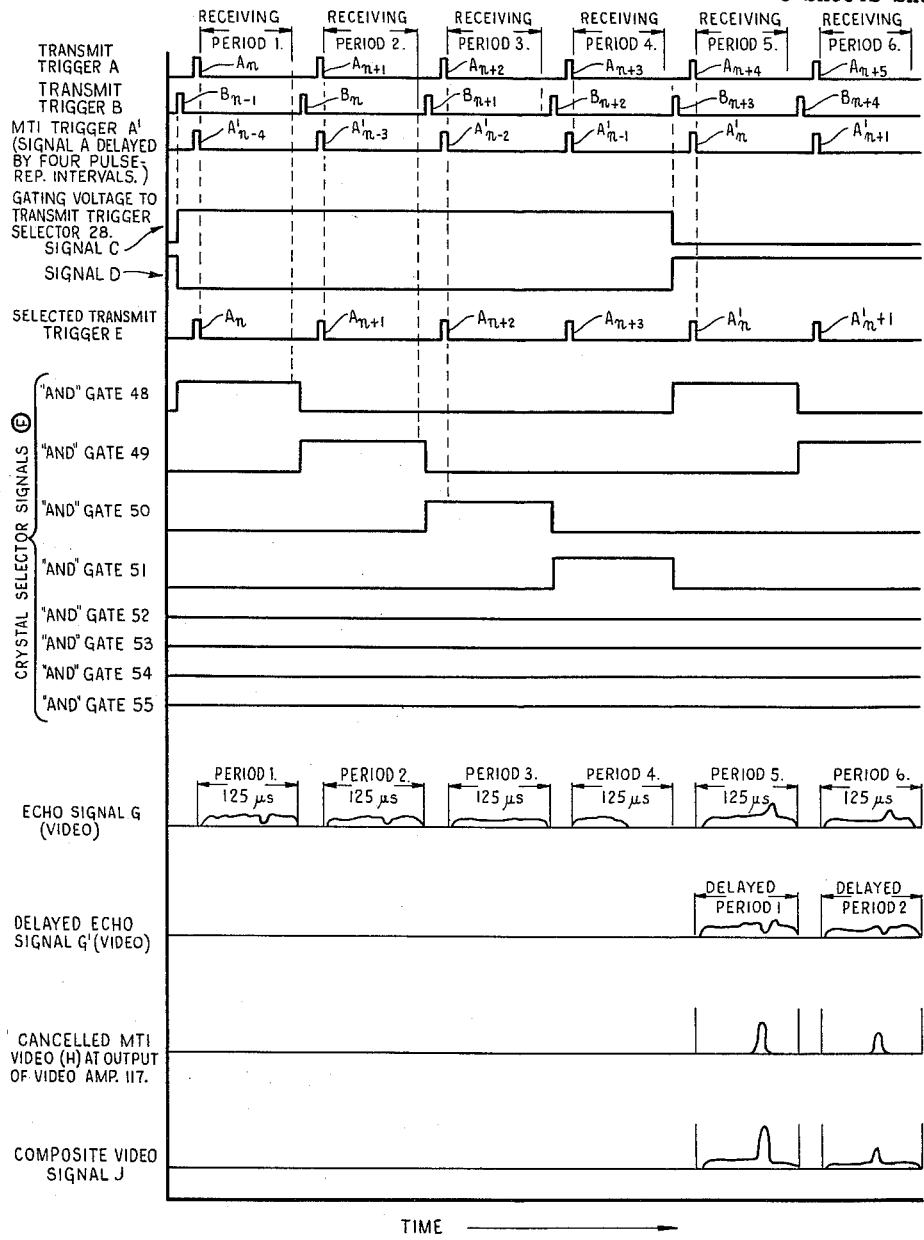
FIG. 8 illustrates the waveforms of various signals throughout the system for receiving intervals 1–6.

Referring now to the drawings, FIG. 1 shows a schematic block diagram of an example of a coherent MTI radar system comprising a programmer and synchronizer 10, an exciter 12, an indicator 14, a transmitter 16, a transmit-receive switch 18, a frequency-scan antenna 20 and a receiver 22. The programmer and synchronizer 10 produces transmit and early triggers A and B, respectively, as shown in FIG. 8 for receiving periods 1 to 6, and which are coupled to the receiver 22. The receiver 22 includes means for delaying the transmit trigger signal A by a predetermined number of pulse-repetition-intervals such as, for example, four. These delayed transmit trigger pulses, designated as MTI trigger pulses A' in FIG. 8, are coupled from the receiver 22 to the programmer and synchronizer 10. The programmer and synchronizer 10 by means of gating voltages C and D alternately selects four successive transmit trigger pulses $A_n$, $A_{n+1}$, $A_{n+2}$ and $A_{n+3}$ and four successive MTI trigger pulses $A'_n$, $A'_{n+1}$, $A'_{n+2}$ and $A'_{n+3}$ to produce a signal E (FIG. 8) designated as the "selected transmit trigger." This selected transmit trigger E is coupled to the exciter 12, the indicator 14 and the transmitter power amplifier 16 for synchronization purposes.

In addition to the above, the programmer and synchronizer 10 provides crystal selector signals F, as illustrated in part in FIG. 8, for the exciter 12 and a transmit-angle signal for the indicator 14. The exciter 12 in response to the crystal selector signals F and the selected transmit trigger E produces transmitter signal pulses of a frequency determined by the crystal selector signals F for the transmitter power amplifier 16 and, in addition, produces local oscillator and continuous transmitter signals which are coupled to the receiver 22. The transmitter power amplifier 16 amplifies the transmitter signal pulses whereupon the amplified pulses are coupled through the transmit-receive switch 18 to the antenna 20 which is a frequency scan antenna whence a beam is radiated in a direction determined by the frequency of the pulse.

The antenna 20 receives echo signals in response to the transmitted pulses which are diverted by the transmit-receive switch 18 to the receiver 22. The video of the echo signals thus received is designated as signal G in FIG. 8.

The aforementioned transmitter and local oscillator signals differ frequencywise by the intermediate frequency of the receiver 22, e.g., 30 megacycles per second, thus enabling the echo signals to be detected and amplified. Consequently, the exciter 12 must generate another local oscillator signal which is displaced frequencywise 30 megacycles from the transmit signal frequency for each discrete frequency required for a given beam position of the antenna 20. This local oscillator signal endures for the respective listening period which may, for example, be of the order of 125 microseconds if a range of 10 nautical miles is desired.

Figure 2:
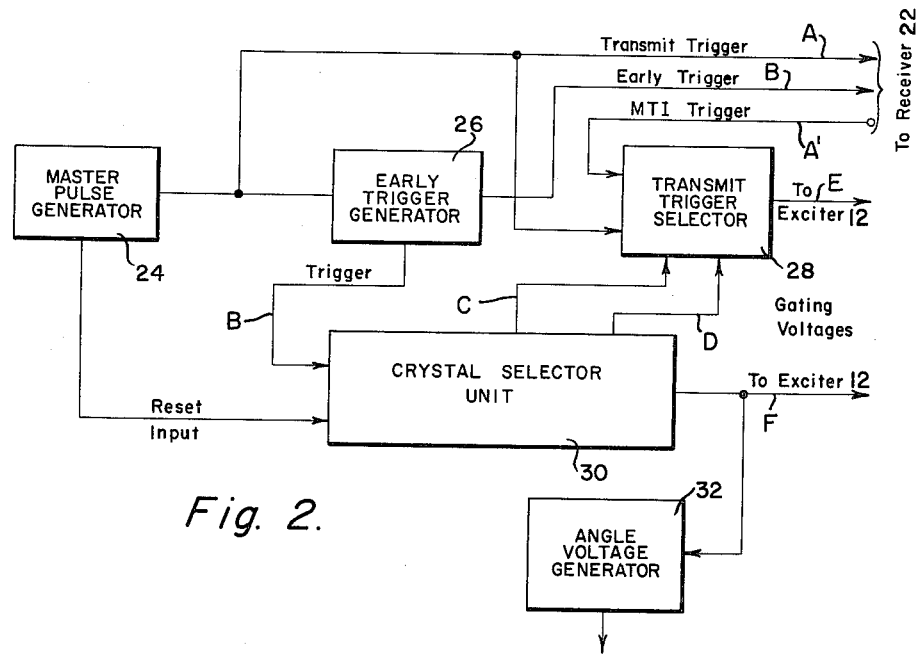
FIG. 2 shows a schematic block diagram of the programmer and synchronizer unit in the radar system of FIG. 1.

As shown in block diagram form in FIG. 2, the programmer and synchronizer 10 has five major subunits: a master pulse generator 24, an early trigger generator 26, a transmit trigger selector 28, a crystal selector unit 30 and an angle-voltage generator 32. The master pulse generator 24 produces the periodic transmit trigger A which provides the basic synchronization for the radar system together with a "reset" pulse. In accordance with the present radar system, one reset pulse is produced after a predetermined number of successive transmit trigger pulses such as, for example, fifty-six.

The early trigger generator 26 accepts the transmit trigger $A_n$ from the master pulse generator 24 and essentially performs a time delay of the trigger. The result is an "early" trigger $B_n$ in the sense that it precedes, in time, the succeeding transmit trigger $A_{n+1}$. The early trigger B is generated at the end of the receiving period which follows each transmitted pulse. The early trigger B together with the reset pulses are applied to the crystal selector unit 30 which, in turn, produces gating voltages C and D for the transmit trigger selector 28 and crystal selector signals F for the exciter 12 and the angle-voltage generator 32. The angle voltage generator 32, in response to the crystal selector signals F, which signals correspond to predetermined beam positions, produces transmit-angle voltages representative of the beam positions. The angle-voltage generator may, for example, constitute a counting apparatus, a frequency-modulated discriminator responsive to a continuous transmitter signal, or a series of direct-current sources of voltages or currents of predetermined magnitudes representative of the respective angles. These latter direct-current voltages or currents could be gated on by the same crystal selector signals F that select the frequencies of the transmit signal. The transmit-angle signal thus produced is, as previously mentioned, applied to the indicator 14 in a manner to determine the direction of the sweep signal of the visual display.

The transmitter selector 28 accepts the gating voltages C and D from the crystal selector unit 30, and the transmit trigger from the master pulse generator 24 and the MTI trigger from the receiver 22. The function of the transmitter trigger selector 28 is to apply the transmitter trigger signals A from master pulse generator 24 to exciter 12 during a first series of four pulses and to apply MTI trigger pulses A' during each second series of four pulses. For MTI purposes it is desirable to obtain the second trigger of each MTI pair by sending the first trigger of the pair through the MTI delay line incorporated in receiver 22 whereby the resulting pulse period stability assures improved cancellation. The MTI pulse pairs used for cancellation are not made up of adjacent transmitted pulses, but are spaced four pulse periods apart in order to eliminate second time around echoes. Thus, the transmit trigger selector selects four triggers in sequence, then selects these same four triggers after they have gone through the MTI delay line. This process is repeated as the sector being covered is scanned.

Figure 3:
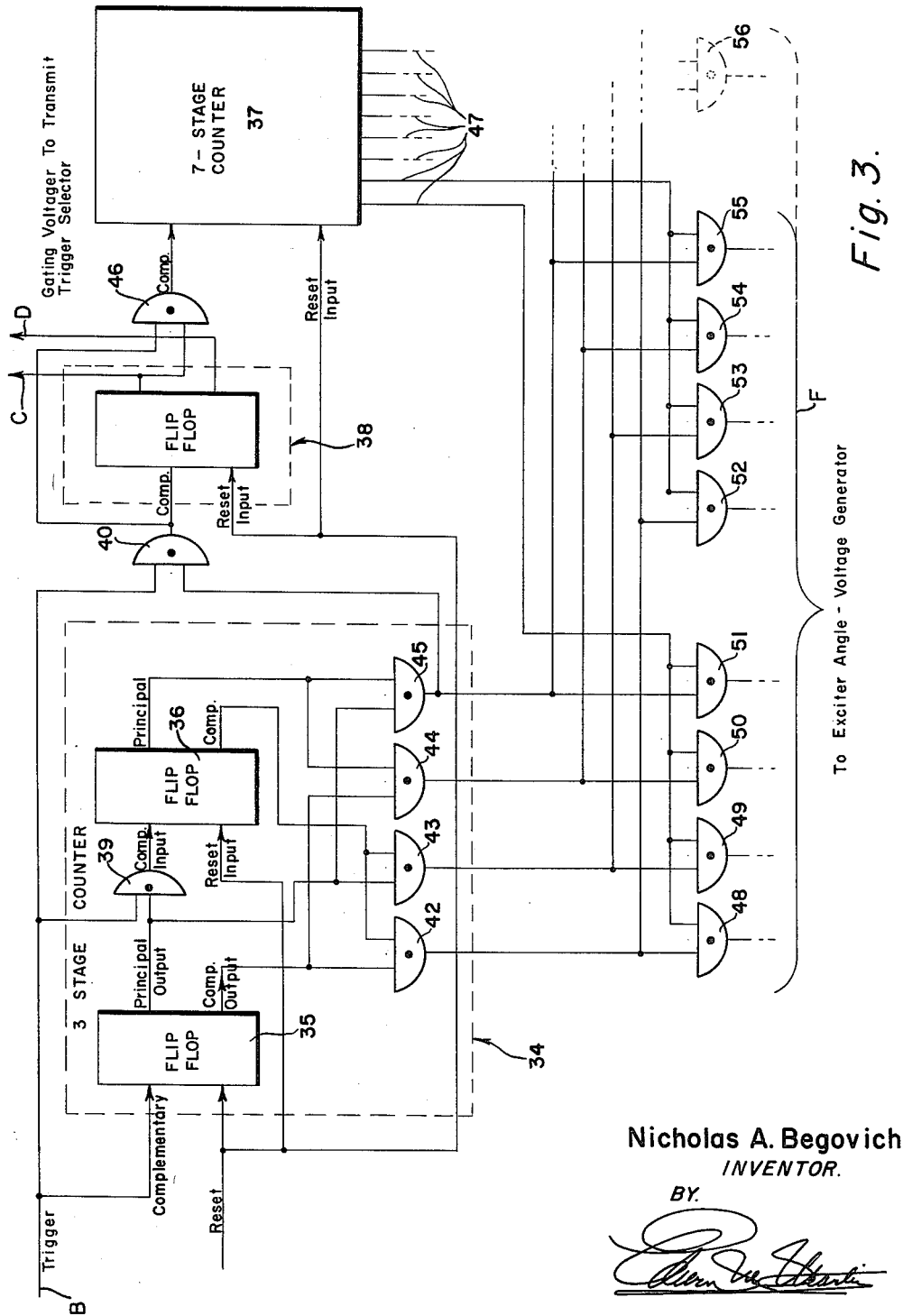
FIG. 3 shows a schematic diagram of a representative crystal selector unit for the programmer and synchronizer unit of FIG. 2.

A schematic block diagram of the principal parts of the embodiment of the crystal selector unit 30 is shown by way of example in FIG. 3. In this figure, an "and" gate is represented by a semicircular block with a dot centered within its boundaries. By an "and" gate is meant that input signals must be present on all the input leads in order to have a signal appear on the output lead. An "or" gate, on the other hand, is represented by a semicircular block with a plus sign (+) centered within its boundaries. In the case of an "or" gate, an input signal appearing on any one input lead appears on the output lead. In either case, the input leads are on the straight side of the block and the output lead is on the semicircular side.

Also, in the present explanation, each flip-flop may have a set, reset and complementary inputs and a principal and complementary outputs. In this respect, the principal output is representative of binary zero and the complementary output representative of binary one following acceptance by the flip-flop of a pulse at the reset input. Conversely, the acceptance by the flip-flop of a pulse at its set input will change the state thereof so that a voltage representative of binary one will appear on the principal output and a voltage representative of binary zero will appear on the complementary output. Successive applications of pulses to the complementary input, on the other hand, effects successive changes of state of the output voltages. Also, in the present case, a convention used with regard to counters wherein the number of stages is equivalent to the highest binary number which can be registered or stored. It is to be noted that in an $n$-stage counter the number of combinations of states is equal to $(n+1)$ when binary zero is included.

Referring now to FIG. 3, the crystal selector unit 30 comprises a 3-stage counter 34 which includes flip-flops 35, 36 a 7-stage counter 37 and an intermediate flip-flop 38. Each of the flip-flops 35, 36 in counter 34, flip-flop 38, and each of the necessary three flip-flops in counter 37 are adapted to receive reset pulses at the respective reset inputs thereby to change the state of all the principal outputs to represent binary zero. Trigger signal pulses are also applied to the complementary input of flip-flop 35 and through "and" gates 39 and 40 to the complementary inputs of flip-flops 38, 36, respectively. The principal output of flip-flop 35 is coupled through "and" gate 39 to the complementary input of flip-flop 36 whereby flip-flops 35, 36 serve as the 3-stage counter 34 of the trigger pulses A.

It is desired to produce a discrete output signal for each of the four combinations of states of counter 34. If the principal output of flip-flop 35 represents the least significant digit and the principal output flip-flop 36, the next least significant digit of a binary number, the four states of the counter 36 are binary zero, one, two and three. Thus, a first signal, representative of binary zero may be generated by applying the complementary outputs of flip-flops 35, 36 to an "and" gate 42; a second signal representative of binary one may be generated by applying the principal output of flip-flop 35 together with the complementary output from flip-flop 36 to an "and" gate 43; a third signal representative of binary two may be generated by applying the complementary output from flip-flop 35 together with the principal output from flip-flop 36 to "and" gate 44; and a fourth signal representative of binary three may be generated by applying the principal output from both flip-flops 35 and 36 to an "and" gate 45. Thus, output signals appear in sequence at the output terminals of the gates 42, 43, 44 and 45 as successive trigger signal pulses A are applied to the counter 34.

The output signal from the "and" gate 45 is coupled through "and" gate 40 to the complementary input of flip-flop 38, whereby an input pulse is applied to the complementary input of flip-flop 38 at every fourth trigger pulse, thereby causing the principal and complementary outputs of flip-flop 38 to change their state after every successive four trigger pulses. These outputs from flip-flop 38 may therefore be used as the gating voltages C and D for the transmit trigger selector 28.

It is desired that the seven-stage counter 37 register every eighth trigger pulse. This may be accomplished, for example, by connecting the output of "and" gate 40 together with the principal output from flip-flop 38 through an "and" gate 46 to the complementary input of the seven-stage counter 37. The seven-stage counter 37 incorporates a series of diode gates for producing a discrete output signal for each combination of states of the three flip-flops included therein. This is accomplished in the same manner as was done in counter 34 except, of course, each diode gate will require three inputs rather than two. The signals thus produced appear on the leads 47 connected from the seven-stage counter 37. In order to produce a discrete signal for selecting a particular set of crystal oscillators the leads 47 are connected to the respective inputs of seven groups of four "and" gates 48, 49, 50, 51; 52, 53, 54, 55; 56, etc. That is, a first lead 47 is connected to one input of each of the "and" gates 48–51, a second lead 47 is connected to one input of each of the "and" gates 52–55, etc. The actual number of groups of four "and" gates employed is determined by the different frequencies required. In the present case, the 28 different frequencies require the use of only seven groups of "and" gates. Inasmuch as the counter 37 is not used to capacity, it is necessary to produce a reset pulse after fifty-six trigger pulses. The output lead from each of the "and" gates 42, 43, 44 and 45 is then connected to the respective inputs in each group of four "and" gates 48–51, 52–55, etc. Thus, it is evident that gating signals F will first appear in sequence at the outputs of "and" gates 48, 49, 50 and 51; reappear in sequence at the outputs of gates 48–51; and then commence appearing in sequence at the outputs of gates 52–55, and so on, for the seven groups of "and" gates. The gating signals F thus produced, as previously mentioned, are employed to select the crystal oscillator frequencies in exciter 12 and are also coupled to the angle voltage generator 32 where they are employed to generate or gate voltages representative of the antenna beam positions.

The exciter 12 is the source of the radiated frequencies which determine the beam positions of the frequency scan antenna 20. The output frequencies of the exciter 12 must be sufficiently stable so that satisfactory cancellation can be effected. The stable frequencies are generated by using crystal-controlled oscillators operating in the region of 100 mc. p.s., and then frequency multiplying to the desired X-band frequencies. The output power of the exciter 12 is of the order of one watt so as to provide sufficient excitation for the power amplifier 16.

A second function of the exciter 12 is to provide a local oscillator signal for the receiver 22 which differs frequencywise from the signal to the amplifier 16 by the 30 mc. p.s. I.F. frequency of the receiver 22. This means that for each discrete frequency required for a given antenna beam position, there must be another frequency generated and displaced frequencywise 30 mc. p.s. and enduring for the listening period of 125 microseconds (10 nautical miles).

A representative embodiment of the exciter 12 is described to illustrate the means for fulfilling the above requirements. The frequency band necessary to scan a 7 degree sector, for example, is from 9,500 mc. p.s. to 10,470 mc. p.s. The beam steps in ¼ degree increments throughout the above sector which dictates that 28 discrete frequencies in the above frequency band must be generated. In order to minimize the number of crystal oscillators, the 28 frequencies are selected so that the antenna beam position angle is to the nearest 0.05 degree from the desired position.

The block diagram of the exciter 12 is shown in FIG. 4. Seventeen crystal oscillators are grouped into the four banks, I, II, III and IV. Each oscillator has a diode "or" gate in its output, the "or" gate being open or closed depending upon the presence or absence of a crystal selector signal F from the programmer 10. In this instance "or" gate is intended to mean that any one of a plurality of crystal selector signals F may open the gate from a particular oscillator. Depending upon the frequency desired, the programmer 10 opens one gate in bank II, one in bank III, and one in either bank I or IV. The output signals from the selected crystal oscillators are mixed and filtered by a transmitter frequency mixer 60 and used as input signals for a transmitter multiplication channel 61 and a receiver mixing unit 62. The receiver mixing unit 62 mixes the above output signal with a continuous wave signal from one oscillator in bank II and one oscillator in bank III, respectively. The resultant frequency of the output signal is displaced frequencywise 0.3716 mc. p.s. from the input frequency to the transmitter multiplication channel 61, and is used as the input to a receiver multiplication channel 63. Both of the channels 61, 63 multiply the frequency of their respective input signals 81 times, thus placing the output frequencies of the transmitter and receiver channels in the required spectrum of X-band frequencies with, however, the respective signals in the two channels being displaced frequencywise from each other by 30 mc. p.s., i.e., the intermediate frequency.

The two multiplication channel output signals are fed directly to the receiver 22 whose input signal power requirements are of the order of 5 milliwatts. The transmitter and receiver frequency signals are used in the MTI circuitry incorporated therein for the generation of a coherent oscillator signal (coho), while the receiver signal is used for a local oscillator signal.

The output signal from the transmitter multiplication channel 61 is also fed to a traveling wave tube (TWT) amplifier 64. This amplifier stage is required because the transmitter power amplifier 16 requires a drive signal of one watt peak power. The TWT is modulated by a narrow pulse from the power amplifier 16, thereby removing the necessity of having a separate modulator and associated power supplies in the exciter 12.

The frequencies of the seventeen crystal oscillators have been chosen so that no harmonic below the tenth falls in the pass band of the mixer filters included in the transmitter and receiving mixing units 60, 63. Harmonics above the ninth should cause no trouble because of their very low amplitudes (100 db below the fundamental).

The transmitter power amplifier 16 operates over a bandwidth and at frequencies suitable for amplifying a transmitter output signal 65 from exciter 12. The power amplifier 16 has, for example, a 47 decibel gain, an output peak pulse power of 50 kilowatts and a pulse length of 0.3 microsecond. A schematic block diagram of the microwave power amplifier 16 of the radar system is shown by way of example in FIG. 5. Referring to this figure, the microwave power amplifier 16 includes a traveling-wave tube buffer amplifier 66 which is driven by the one watt transmitter signal 65 from the azimuth exciter 12. The buffer traveling-wave tube 66 has a gain of approximately 30 decibels and is similar to the traveling-wave tube amplifier 64 employed in the exciter 12. During operation the cathodes of both traveling-wave tubes are pulsed with a pulse designated by reference numeral 67 which is produced by means of a common modulator 68. The pulse 67 constitutes a 10 kilovolt negative pulse of 0.4 microsecond's duration with rise and fall times of 0.3 microsecond, the rise of each pulse 67 being initiated by the transmit trigger E from the programmer and synchronizer 10. The signal output pulse from traveling-wave amplifier tube 66 is designated by reference numeral 69.

A high power traveling-wave tube 70 capable of approximately 17 decibel gain provides the final amplifier stage. A tube of this type is disclosed in a copending application for patent, Serial No. 450,987, entitled High Power Microwave Tube, filed August 19, 1954, by Charles K. Birdsall, now U.S. Patent No. 2,957,103, which application is assigned to the same assignee as is the present application. In the case of the traveling-wave tube 70, however, the transmit trigger from the programmer and synchronizer 10 is first delayed by 0.35 microsecond by means of a delay line 71. The delayed transmit trigger pulse is then employed to trigger an output modulator 72 which, in turn, energizes a 1:3 pulse transformer 73 to produce a −30 kilovolt, 0.3 microsecond pulse designated by reference numeral 74. This 30 kilovolt pulse 74 is impressed on the cathode of the traveling-wave tube 70 during an interval that is co-extensive with the duration of the pulsed transmitter signal 69 from the buffer traveling amplifier tube 66. The pulsed transmitter output signal 69 from the tube 66 has an envelope, as indicated in FIG. 5, that corresponds to the shape of the pulse 67 generated by the modulator 68, that is, a duration of 0.4 microsecond and a rise and fall time of 0.3 microsecond. Inasmuch as the 30 kilovolt pulse 74 has been delayed 0.35 microsecond from the beginning of the rise of the pulse 67, amplification by the traveling-wave tube 70 commences 0.05 microsecond after the start of and ends 0.05 microsecond prior to the termination of the flat top or 0.4 microsecond portion of the pulse 67. From the above it is apparent that the traveling-wave tube 70 has full microwave frequency excitation during the entire duration of the 0.3 microsecond, 30 kilovolt pulse 74. Thus, the output signal 75 from the traveling-wave tube 70 illustrated in FIG. 5, which signal is employed to energize the frequency-scan antenna 20, has a 0.3 microsecond duration, is of the same frequency as signal pulse 65 generated in the exciter 12 and has a peak power of the order of 50 kilowatts.

Detailed block diagrams of the receiver 22 are shown in FIGS. 6 and 7. FIG. 6 shows the details of the receiver 22 while FIG. 7 gives a detailed breakdown of the cancellation unit contained therein. It is desirable that the receiver 22 provide both normal and MTI video output. In the present system the MTI video is available for all the beam positions of the system.

Referring to FIG. 6 the target echo signal G from antenna 20 and the C.W. receiver oscillator signal from the exciter 12 are mixed in a hybrid-tee type balanced mixer 78. The local oscillator signal is mixed also with the C.W. transmitter signal in a mixer 80. Both of these mixers use crystal diodes. The output of mixer 78 feeds an I.F. preamplifier 81 which is physically mounted next to the mixer. The I.F. output from the preamplifier provides the input to both a normal video channel 82 and an MTI video channel 84.

In the normal video channel 82, the I.F. signal is further amplified in an I.F. amplifier 85 and video detected and isolated by the cathode follower 86. The video output signal from the cathode follower 86 is then passed through a fast time constant (FTC) circuit 87. The output of the FTC circuit 87, which can be switched in or out, is fed to a video selector 118. If desired, sensitivity time control (STC) can be combined with normal I.F. gain control and applied to the first few stages of the I.F. amplifier 85.

In the MTI channel 84, the I.F. video signal G from preamplifier 81 is passed through an MTI limiting I.F. amplifier 88 and then inserted into a coherent phase detector 90. The reference I.F. signal, i.e., the coho signal, from mixer 80 is amplified in a coherent reference I.F. amplifier 91 and fed also to the coherent phase detector 90 to serve as the phase reference signal for each range sweep. The detected video signal G′ from coherent phase detector 90 is passed through an FTC circuit 92 and then amplified in a video preamplifier 93 and applied to a cancellation unit 94.

In the cancellation unit 94 the video signals G received during a range sweep after each transmitted pulse are delayed four repetition periods and subtracted from the corresponding signals received from the next transmitted pulse at the same beam position. The video signals of relatively constant amplitude, such as those from the ground areas, cancel in the subtracting process; but video signals of fluctuating amplitude, such as those from moving targets, have a residue output after the subtraction. The cancellation is illustrated in FIG. 8 wherein delayed echo signal G′ is subtracted from echo signal G. In that both signals correspond to beam positions of the exact same direction, the return from fixed targets, e.g., clutter is almost identical and therefore almost completely cancels in the subtraction process leaving the signal H.

The cancellation unit also serves to control the MTI pulse repetition frequency of the transmitter. As will be described below, the same delay line used in the subtracting process is used also to accurately time space the second pulse of each MTI pair, e.g., the $A_n$ and $A'_n$ pulses of the pulse train.

In the present system the signals in the delayed and undelayed channels in the cancellation unit will not use amplitude modulated (AM) signals as is normally done since this method has several major disadvantages. The degree of clutter cancellation obtained in an AM subtraction unit depends upon a critical gain balance between the delayed and undelayed channels and a high degree of linearity and good stability in the bandpass characteristics of each channel. These requirements are met usually by the use of feedback stabilized amplifiers or by the use of an automatic gain control (AGC) signal derived from the residue of a sample testing pulse introduced into the cancellation unit. This technique of stabilizing the two channels involves a considerable number of components and does not usually possess long-time stability.

A cancellation unit which uses the input video information to frequency modulate (FM) an I.F. carrier, as shown in FIG. 7, is described in detail in a copending application for patent, Serial No. 327,558, entitled Moving Target Selector, filed by Harold V. Hance and Norman H. Enenstein, December 23, 1952, and assigned to the same assignee as the present application. This system does not have any of the disadvantages of the AM technique described above. Referring to FIG. 7, the incoming video signal G is transformed to a frequency modulated I.F. carrier by means of a reactance tube controlled oscillator 95. An increased signal level is obtained by means of a pre-delay line amplifier 96, the output of which is applied to both the delayed and undelayed channels 97, 98, respectively. The pre-delay line amplifier 96 is gated off for the duration of an amplified MTI trigger A' obtained from timing circuits 100 which comprise a fused quartz delay line. The MTI trigger A' fed to the timing circuits 100 is provided by the programmer and synchronizer 10. The signal containing envelope gated information and frequency modulated information from pre-delay amplifier 96 is delayed by means of a delay line 101 and reamplified in a post-delay line amplifier 102. The delayed MTI trigger is AM detected from the I.F. carrier envelope by an AM detector 104 and is passed through the timing circuits 100 to be used as the trigger for the second MTI transmitted pulse. Every fifth pulse is thus accurately spaced with respect to the preceding first pulse. Since the MTI trigger gating of the I.F. carrier does not coincide in time with the target echo video signal, the gating of the I.F. carrier envelope will not result in the sacrifice of any FM information in the video signal.

The undelayed FM I.F. signal G is amplified in an undelayed isolation channel amplifier 105. Gates 103 and 106 are activated by a modulus eight counter 110 which is controlled by MTI early triggers. This arrangement permits every alternate set of four pulses to be suppressed by the gates 103, 106. A different counter would, of course, be required for a radar system which would suppress four pulses and then pass eight pulses whereby each beam position may be scanned three times thus permitting two MTI comparisons. As mentioned previously, the scans are sequenced in sets of fours in order to avoid any difficulties with second time around echoes. The first four scans provide the initial pulses for the MTI and the second four scans provide the comparison pulses for the MTI video. The modulus eight counter 110 is reset to insure that the first set of four pulses of every complete scan cycle are the ones that are suppressed. The fifth MTI early trigger will open gates 103 and 106 and permit the delayed echoes constituting signal G' of the first four MTI pulses to reach the limiter mixer 112 and be compared with the undelayed echoes constituting signal G of the next four MTI pulses. The ninth MTI trigger will close gates 103 and 106 and thus prevent the comparison of the delayed echoes of the second set of four MTI range sweeps with the undelayed echoes of the third set of four MTI sweeps. In the present radar system, this third set of sweeps corresponds to different beam positions from the first two sets and therefore should be compared with the fourth set of sweeps, etc.

The limited output of the echoes of the first pair (sweeps 1 and 5) of MTI sweeps are subtracted in the mixer 112 whose predominant output frequency is proportional to the difference in the amplitudes one would obtain in an AM cancellation system. The extraneous I.F. carrier that comes through the mixer is eliminated by an I.F. rejection filter 114. Differentiation and video amplification of the remaining signal by a differentiator and video amplifier 115 results in the transformation of triangular waveform signals into corresponding bipolar square waveform signals. The bipolar video from differentiator and video amplifier 115 is converted into a unipolar signal H by a full wave rectifier 116. The resulting rectified MTI video signal is amplified by a video amplifier 117 and applied to a video selector 118 along with the normal video signal to form a composite signal J, illustrated in FIG. 8.

The video selector 118 is activated by a monostable multivibrator 120 which is controlled by the MTI early trigger. When there are no MTI triggers, only normal video gets through to the display of indicator 14 until the monostable multivibrator 120 returns to its stable state. The time constant of this multivibrator 120 is made adjustable by a potentiometer whereby the proportioning of the range sweep between MTI video and normal video can be optimized to the prevailing clutter conditions. The video selector 118 also permits simultaneous presentation of normal and MTI video for mapping purposes as mentioned previously.

What is claimed is:

1. A moving target indication radar system comprising a frequency-scan antenna for transmitting exploratory pulses in directions determined in each instance by the frequency of the excitation energy; means for generating a first group of 1, 2, . . . $n$ trigger signals at a predetermined pulse repetition rate wherein $n$ is a positive integer no less than two; means responsive to said first group of 1, 2, . . . $n$ trigger signals for successively applying 1, 2, . . . $n$ pulses of different predetermined frequencies, respectively, to said frequency-scan antenna whereby 1, 2, . . . $n$ exploratory pulses are transmitted in successively changing directions; a receiver coupled to said antenna for receiving echo signals in response to exploratory pulses whereby a first series of trains of target echo signals are received in response to said first group of 1, 2 . . . $n$ exploratory pulses; a delay line coupled to said receiver for delaying said first series of trains of target echo signals applied thereto for an interval of time equal to $n$ pulse repetition intervals, means for generating a second group of 1, 2, . . . $n$ trigger signals having a pulse repetition rate equal to said predetermined pulse repetition rate and commencing one of said pulse repetition intervals after the transmission of the $n$th exploratory pulse of said first group of trigger signals; means responsive to said second group of 1, 2, . . . $n$ trigger signals for successively applying 1, 2, . . . $n$ pulses of said different predetermined frequencies, respectively, to said frequency-scan antenna whereby 1, 2, . . . $n$ exploratory pulses are transmitted in exactly the same directions as said successively changing directions and a second series of trains of target echo signals received in response thereto; and means for comparing at least a portion of said delayed first series of trains of target echo signals with respective corresponding portions of said second series of trains of target echo signals to produce a third series of trains of signals indicative only of moving targets.

2. The moving target indication system as defined in claim 1 wherein said means for generating a second group of 1, 2, . . . $n$ trigger signals having a pulse repetition rate equal to said predetermined pulse repetition rate and commencing one of said pulse repetition intervals after the transmission of the $n$th exploratory pulse of said first group of trigger signals includes means for coupling said first group of 1, 2, ... $n$ trigger pulses to said delay line, and means responsive to the output of said delay line for isolating and amplifying said delayed first group of 1, 2, ... $n$ trigger pulses thereby to provide said second group of 1, 2, ... $n$ trigger pulses.

References Cited in the file of this patent

UNITED STATES PATENTS

| | | |
|---|---|---|
| 2,579,497 | Isbister | Dec. 25, 1951 |
| 2,650,357 | Munster | Aug. 25, 1953 |
| 2,664,522 | Page | Dec. 29, 1953 |
| 2,714,205 | Grayson | July 26, 1955 |
| 2,842,761 | Downs | July 8, 1958 |

OTHER REFERENCES

Penrose et al.: "Principles and Practices of Radar," vol. 5, 1955, published by George Newnes Ltd., London, England, p. 652.